United States Patent
Cho

(10) Patent No.: US 10,196,014 B2
(45) Date of Patent: Feb. 5, 2019

(54) SEAL MOLD DIVIDED STRUCTURE FOR COMBINATION CABLE AND METHOD FOR MANUFACTURING THE SAME

(71) Applicant: Continental Teves AG & Co. oHG, Frankfurt (DE)

(72) Inventor: YongWoon Cho, Sejong (KR)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/684,158

(22) Filed: Aug. 23, 2017

(65) Prior Publication Data
US 2018/0029543 A1 Feb. 1, 2018

Related U.S. Application Data

(63) Continuation of application No. PCT/KR2016/001755, filed on Feb. 23, 2016.

(51) Int. Cl.
*B60R 16/02* (2006.01)
*H01B 7/00* (2006.01)
(Continued)

(52) U.S. Cl.
CPC ............ *B60R 16/0215* (2013.01); *B60T 7/12* (2013.01); *H01B 7/009* (2013.01); *H01B 7/0045* (2013.01);
(Continued)

(58) Field of Classification Search
CPC ..... B60R 16/0215; B60T 7/12; H01B 7/0045; H01B 7/009; H01R 13/5845; H02G 15/00
(Continued)

(56) References Cited

U.S. PATENT DOCUMENTS

2007/0045003 A1* 3/2007 Cairns ...................... H01B 7/28
174/539
2013/0277087 A1 10/2013 Hayakawa et al.

FOREIGN PATENT DOCUMENTS

CN 1364328 8/2002
CN 202068133 U 12/2011
(Continued)

OTHER PUBLICATIONS

Chinese Office Action dated Jun. 1, 2018 for corresponding Chinese application No. 201680005842.3.
(Continued)

*Primary Examiner* — Timothy Thompson
*Assistant Examiner* — Charles Pizzuto

(57) ABSTRACT

A seal mold divided structure for combination cable is characterized in that it comprises the following structures: a first cable and a second cable separated from the combination cable; a connector provided at the end of said first cable; a division molding portion that molds the division part between said first cable and second cable and keeps said first cable and second cable separated from each other; a connector molding portion that molds the connection part between said connector and said first cable; a protection tube that protects said first cable, with its ends respectively fixed to said division molding portion and said connector molding portion; and isolation portions, which are respectively inserted from the inner sides of both ends of said protection tube and wrap the exterior of said first cable, capable of preventing inflow of a molding compound.

11 Claims, 8 Drawing Sheets

(51) Int. Cl.
*H01R 13/58* (2006.01)
*B60T 7/12* (2006.01)
*H02G 15/00* (2006.01)
*H01B 3/30* (2006.01)
*H01B 9/00* (2006.01)

(52) U.S. Cl.
CPC ......... *H01R 13/5845* (2013.01); *H02G 15/00* (2013.01); *H01B 3/302* (2013.01); *H01B 9/003* (2013.01)

(58) Field of Classification Search
USPC .......................................... 174/71 R; 188/158
See application file for complete search history.

(56) References Cited

FOREIGN PATENT DOCUMENTS

| | | |
|---|---|---|
| CN | 202772331 U | 3/2013 |
| CN | 203387021 U | 1/2014 |
| CN | 204010769 U | 12/2014 |
| CN | 204155655 U | 2/2015 |
| JP | 05041988 | 1/1979 |
| JP | 2005294132 A | 10/2005 |
| JP | 2011014413 A | 1/2011 |
| JP | 2013045729 A | 3/2013 |
| JP | 2013237428 A | 11/2013 |
| JP | 5434748 B2 | 3/2014 |
| NL | 1012154 C2 * | 11/2000 |
| NL | 1012154 H * | 11/2000 |
| WO | 2014103499 A1 | 7/2014 |

OTHER PUBLICATIONS

International Search Report and Written Opinion of the International Searching Authority dated May 5.2016 for aorresponding PCT application No. PCT/KR2016/001755.

Japanese Office Action dated Jul. 25, 2018 for corresponding Japanese application No. 2017-541092.

* cited by examiner

SEAL MOLD DIVIDED STRUCTURE FOR COMBINATION CABLE AND METHOD FOR MANUFACTURING THE SAME

CROSS-REFERENCE TO RELATED APPLICATIONS

This application claims the benefit of PCT Application PCT/KR2016/001755, filed Feb. 23, 2016, which claims priority to Korean Application 2015-0025401, filed Feb. 23, 2015. The disclosures of the above applications are incorporated herein by reference.

TECHNICAL FIELD

The present invention relates to a seal mold divided structure for combination cable and method for manufacturing the same, more specifically to a seal mold divided structure for combination cable and method for manufacturing the same, wherein cables respectively connected to a wheel speed sensor and electronic parking brake are fixed integrally in a separate state.

BACKGROUND ART

Generally, the electronic parking brake (EPB) of a vehicle is a braking device that automatically locks for braking when the vehicle is stopped and automatically unlocks the braking once the acceleration pedal is stepped on at startup. As it can brake without the need of stepping on the brake, the EPB has been used in more and more vehicles.

By motor driving, the EPB grips or loosens a disc, thus locking or unlocking the brake. An EPB cable, by using a connector, is connected to the motor to supply electric power. In addition, in order to sense the rotation speeds of wheels after an ABS is enabled, a wheel speed sensor (WSS) is equipped around the EPB. The WSS also transmits or receives sensing signals by using a cable.

However, in the past, an EPB cable and a WSS cable in a vehicle were equipped separately and connected to the motor and the WSS respectively. As the cables were disposed separately, it was difficult to sort out the cables clearly; consequently, the vehicle quality was affected.

In addition, in order to resolve the above-mentioned problem, an EPB cable and a WSS cable were bound and connected with each other. However, no suitable structure has been provided regarding the division point between a motor and a WSS to separate the cables.

The background art of the present invention is what is described in Korean registered patent No. 10-0589195 (title of invention: An Electrodynamic Automatic Braking Device for Vehicles, dated Jun. 12, 2006).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A seal mold divided structure for combination cable and method for manufacturing is provided, wherein cables respectively connected to a wheel speed sensor and electronic parking brake are fixed integrally in a separate state.

The seal mold divided structure for combination cable is characterized in that it comprises the following structures: a first cable and a second cable separated from the combination cable; a connector provided at the end of said first cable; a division molding portion that molds the division part between said first cable and second cable and keeps said first cable and second cable separated from each other; a connector molding portion that molds the connection part between said connector and said first cable; a protection tube that protects said first cable, with its ends respectively fixed to said division molding portion and said connector molding portion; and isolation portions, which are respectively inserted from the inner sides of both ends of said protection tube and wrap the exterior of said first cable, capable of preventing inflow of a molding compound.

In addition, said connector can be used as the connector of an EPB and connect the WSS or the WSS extension cable connector to said second cable.

In addition, said division molding portion comprises the following structures: an integral portion, which wraps the outer surface of said combination cable and fixes it; a first division portion, which is formed by bending towards the side of the first cable exposed to said integral portion; a second division portion, which is formed by straightening towards the side of the second cable exposed to said integral portion.

In addition, said isolation portion comprises an insertion portion, which is inserted into the inner side of said protection tube; and an expansion portion, which closely fits the inlet of said protection tube after expanding at the end of one side of said insertion portion, capable of preventing the flow of said molding compound into said protection tube.

In addition, on said isolation portion, a cut-open portion that is cut open lengthwise is formed and into which said first cable can be inserted.

In addition, the inner surface of said isolation portion is elliptical and that the isolation portion wraps the outer surface of said first cable, which comprises two winding displacements, thus preventing the inflow of a molding compound.

In addition, in order to facilitate the insertion into the inner side of said protection tube, a narrow portion, having an outer diameter smaller than that of said insertion portion, is formed at the end of said insertion portion.

In addition, in order to install a mounting bracket, a cord grommet portion is formed and integrated on the outer surface of said division molding portion.

In addition, said cord grommet portion is located on the integral portion of said division molding portion.

In addition, to form a predetermined angle with said first cable when said connector is installed, said connector molding portion bends to take a "¬" shape.

In order to achieve the aforesaid purpose, the method for manufacturing the seal mold divided structure for combination cable comprises the following phases: the phase of removing the sheathing of the combination cable to expose the first cable and the second cable and separating them; the phase of providing a protection tube on the outer surface of the separated first cable; the phase of wrapping said first cable from the inner sides at both ends of said protection tube and respectively inserting and setting isolation portions; the phase of providing an EPB connector at the end of said first cable; the phase of providing a WSS at the end of said second cable; the phase of wrapping and molding the division portion between said first cable and second cable and one end of said protection tube to form a division molding portion; and the phase of wrapping and molding the connection portion between said connector and said first cable and the other end of said protection tube to separate it from said division molding portion, thus forming a connector molding portion.

With a seal mold divided structure for combination cable and method for manufacturing the same disclosed by the present invention, the first cable and the second cable respectively connected to an electronic parking brake and a wheel speed sensor are fixed integrally in a separate state.

In addition, on the outer surface of the first cable of an EPB disclosed by the present invention, a protection tube is provided to protect the first cable against damages.

In addition, isolation portions are inserted and set from the inner sides of both ends of the protection tube. Thus, the flow of a molding compound into the protection tube can be prevented, and the molding performance can be improved by maintaining the injection pressure.

In addition, a division molding portion is formed; it is formed by simultaneously wrapping and molding the second cable of the WSS and the first cable of the EPB, capable of keeping the first cable and the second cable in a stable state of division.

In addition, a cord grommet portion is formed on the division molding portion; thus, the combination cable can be supported conveniently by using the mounting bracket.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
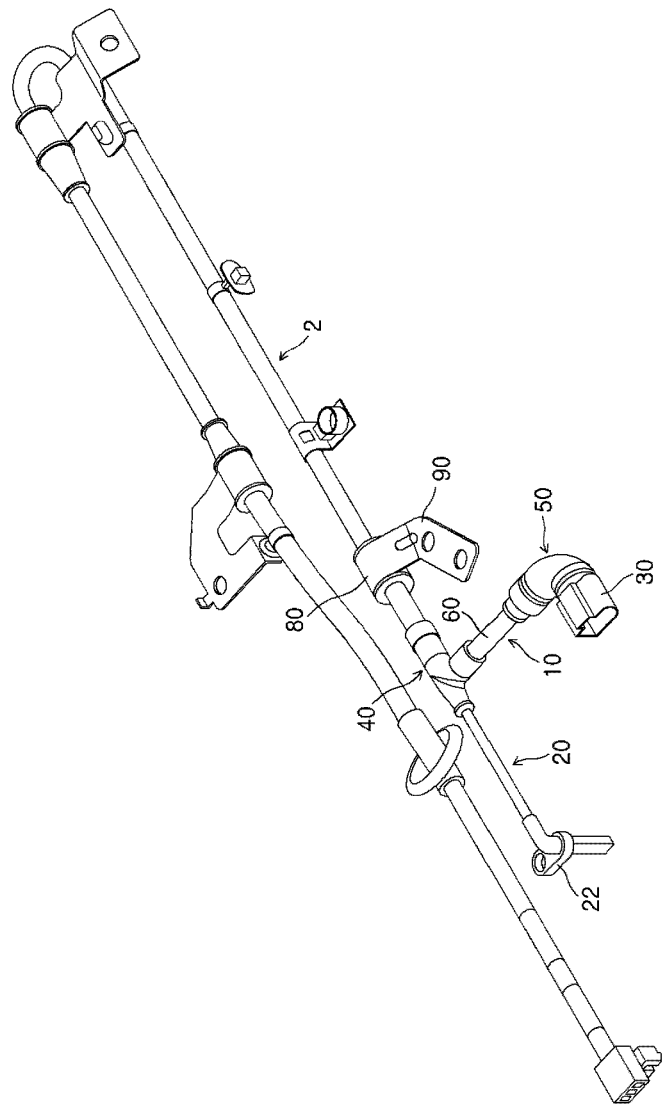
FIG. 1 shows an oblique view of the complete structure of a combination cable described in an embodiment of the present invention.

By referring to the drawings, the following describes in detail the method for manufacturing a seal mold divided structure for combination cable according to the present invention.

For ease and clarity of description, representations of the line thicknesses or sizes of structure elements shown in the drawings may be exaggerated. In addition, the terms used in the following description are the terms defined according to the functions in the present invention and vary with the intentions of users and operators or usual practice. Therefore, these terms should be defined on the basis of the entire contents of this specification.

Figure 2:
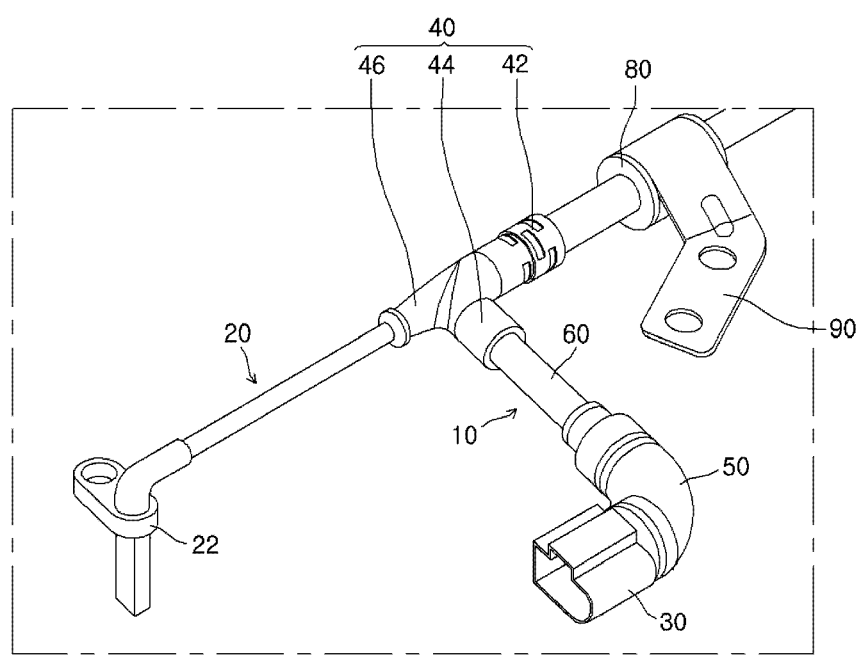
FIG. 2 shows an enlarged oblique view of the seal mold divided structure of a combination cable described in an embodiment of the present invention.
Figure 3:
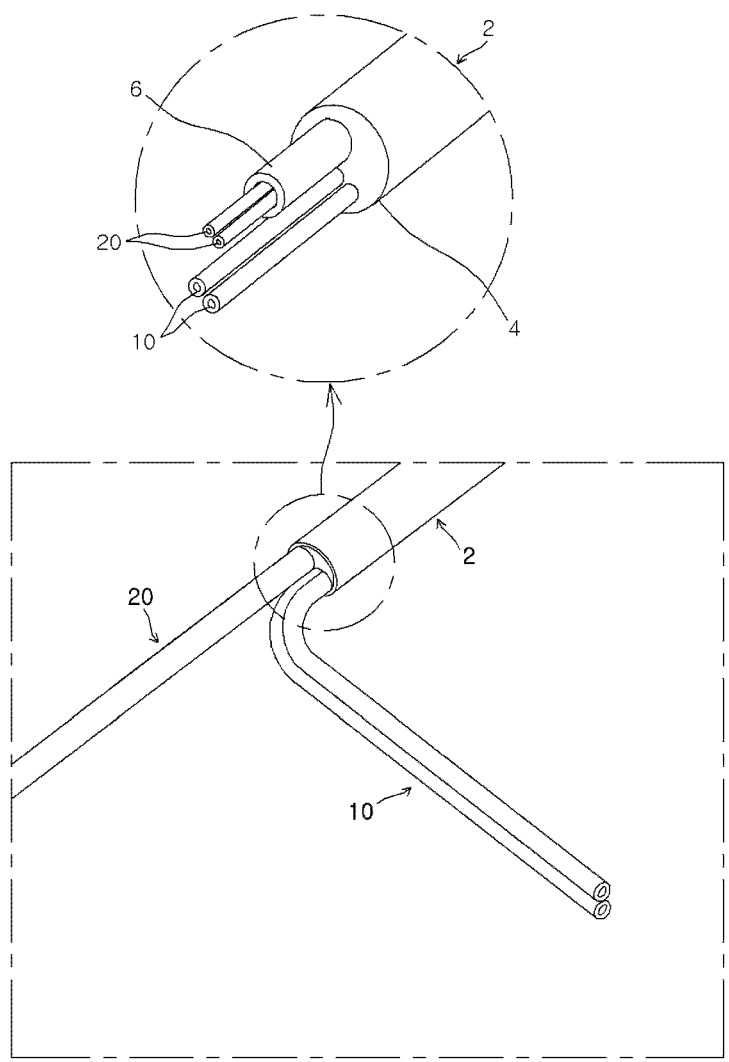
FIG. 3 shows the state in which the first cable and second cable are exposed after the sheathing of the combination cable is removed in an embodiment of the present invention.
Figure 4:
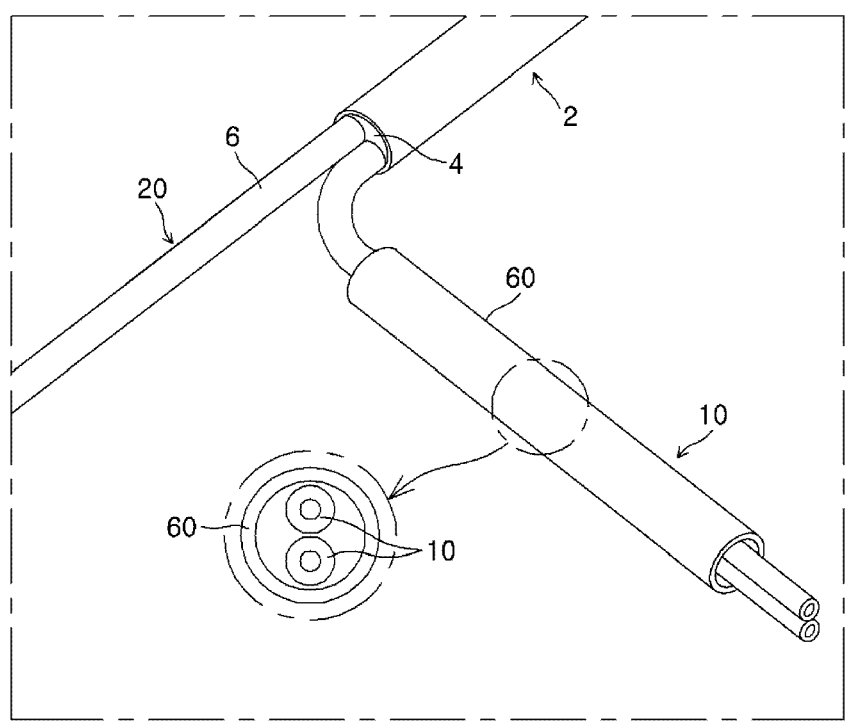
FIG. 4 shows the state in which a protection tube is provided on the first cable in an embodiment of the present invention.

FIG. 1 shows an oblique view of the complete structure of a combination cable described in an embodiment of the present invention. FIG. 2 shows an enlarged oblique view of the seal mold divided structure of a combination cable described in an embodiment of the present invention. FIG. 3 shows the state in which the first cable and second cable are exposed after the sheathing of the combination cable is removed in an embodiment of the present invention. FIG. 4 shows the state in which a protection tube is provided on the first cable in an embodiment of the present invention.

Figure 5:
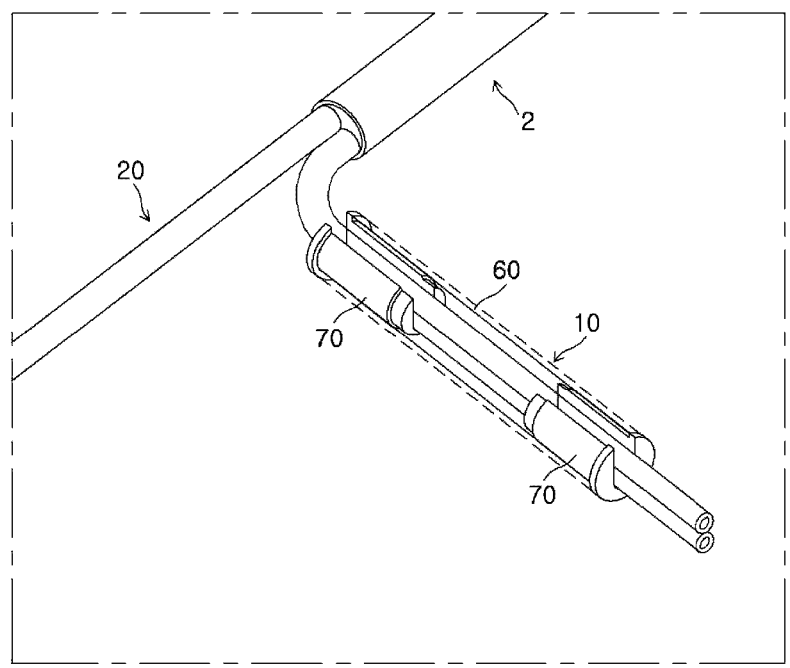
FIG. 5 shows the state in which isolation portions are inserted and set respectively from either end of the protection tube in an embodiment of the present invention.
Figure 6:
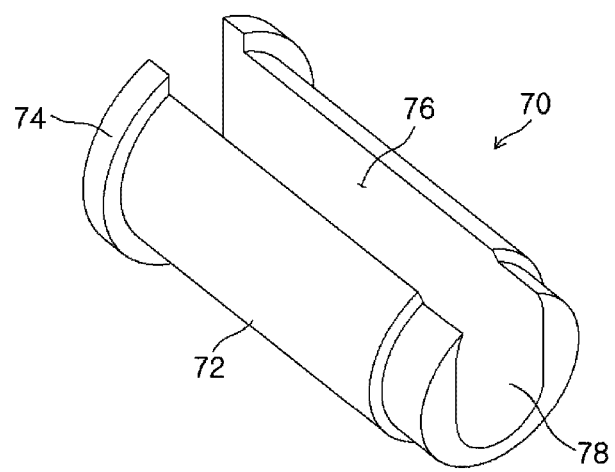
FIG. 6 shows an enlarged oblique view of the isolation portion in an embodiment of the present invention.
Figure 7:
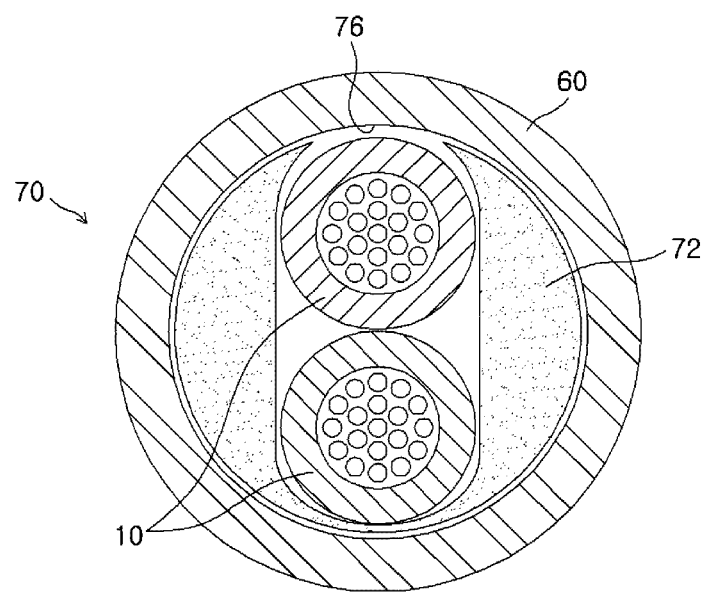
FIG. 7 shows a sectional view of the state in which the protection tube and the isolation portion are provided on the first cable in an embodiment of the present invention.
Figure 8:
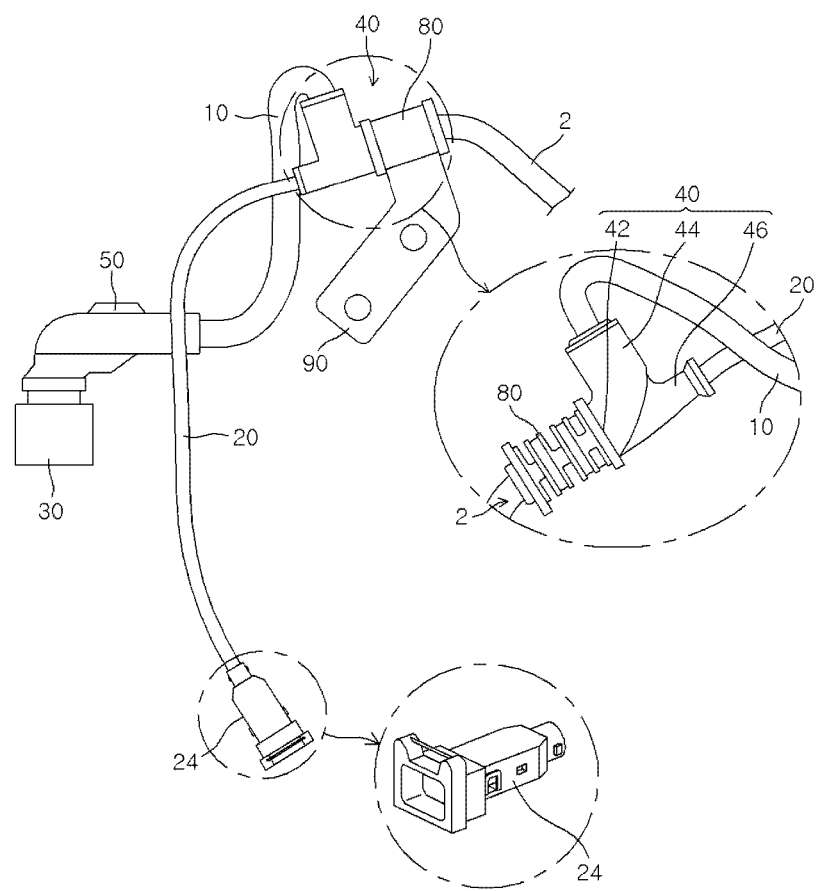
FIG. 8 shows the state in which a cord grommet portion is formed on the division molding portion in a seal mold divided structure for combination cable according to the present invention.
Figure 9:
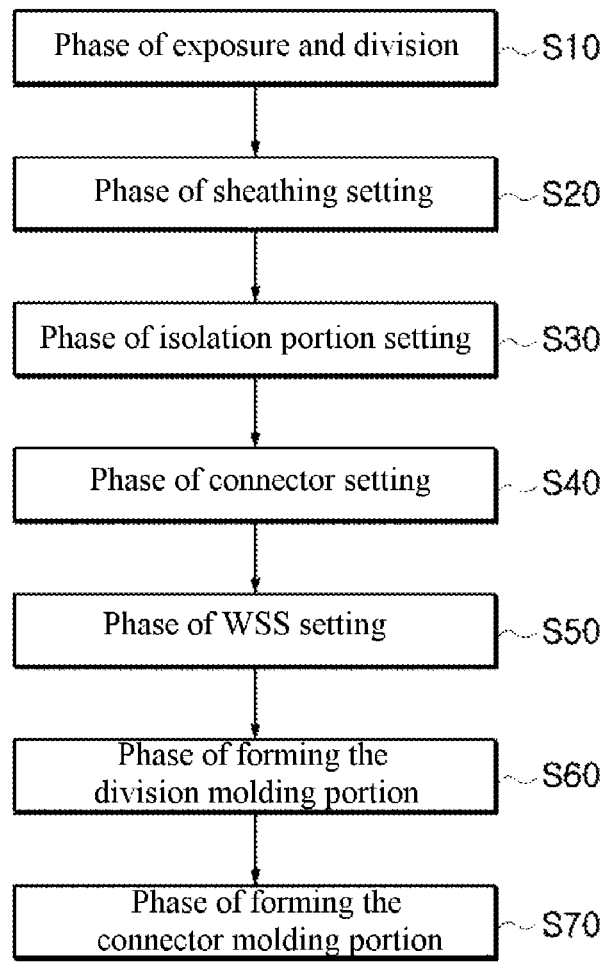
FIG. 9 shows a flow chart of the procedure of manufacturing a seal mold divided structure of a combination cable described in an embodiment of the present invention.

FIG. 5 shows the state in which isolation portions are inserted and set respectively from either end of the protection tube in an embodiment of the present invention. FIG. 6 shows an enlarged oblique view of the isolation portion in an embodiment of the present invention. FIG. 7 shows a sectional view of the state in which the protection tube and the isolation portions are provided on the first cable in an embodiment of the present invention. FIG. 8 shows the state in which a cord grommet portion is formed on the division molding portion in a seal mold divided structure for combination cable according to the present invention. FIG. 9 shows a flow chart of the procedure of manufacturing a seal mold divided structure of a combination cable described in an embodiment of the present invention.

As shown in FIG. 1 to FIG. 8, a seal mold divided structure for combination cable described in an embodiment of the present invention comprises the first cable (10), the second cable (20), the connector (30), the division molding portion (40), the connector molding portion (50), the protection tube (60), and the isolation portion (70).

As shown in FIG. 1 and FIG. 2, after the first cable (10) is separated from the combination cable (2), an electrical parking brake (EPB) is connected to its end. The first cable (10) is exposed outside by removing the sheathing (4) of the combination cable (2). The first cable (10) comprises two winding displacements, which can be configured with one below the other.

After the second cable (20) is separated from the combination cable (2), the wheel speed sensor (WSS) (22) or the WSS extension cable connector (24) is connected to its end. As shown in FIG. 3, the second cable (20) is exposed outside by removing the outer sheathing (4) of the combination cable (2). In this case, the second cable (20) may additionally have the inner sheathing (6) on the inner side of the outer sheathing (4); thus, the two winding displacements of the second cable (20) cannot be exposed until the inner sheathing (6) is removed. The WSS (22) is connected to the two winding displacements of the second cable (20) and operates.

In addition, as shown in FIG. 8, the WSS extension cable connector (24) can further be connected to the end of the second cable (20).

The connector (30) is provided at the end of the first cable (10), allowing the EPB to operate. After the connector (30) is connected to the end of the first cable (10), it is fixed by using the connector molding portion (50) described below.

The division molding portion (40) is a mold structure that is molded in the divided part between the first cable (10) and the second cable (20) and keeps the first cable (10) and the second cable (20) in a divided state. By means of molding, the division molding portion (40) integrally fixes the combination cable (2), the second cable (20), which is formed by connecting to it in a straight line, and the first cable (10) division portion that bends into ¬ shape. Thus, the first cable (10) and the second cable (20) remain divided on the combination cable (2).

The division molding portion (40) comprises the following structures: the integral portion (42), which wraps and fixes the outer surface of the outer sheathing (4) of the combination cable (2); the first division portion (44), which is formed by bending towards the side of the first cable (10) exposed to the integral portion (42); the second division portion (46), which is formed by straightening towards the side of the second cable (20) exposed to the integral portion (42). In this case, the diameter of the first division portion (44) almost remains the same from one end to the other end. This ensures that the first division portion (44) securely fixes one end of the protection tube (60) and keeps the first cable (10) bent. In addition, the diameter of the second division portion (46) gradually decreases from the integral portion (42) to the end. The diameter of the second cable (20) is smaller than the diameter of the protection tube (60) that wraps the first cable (10). Therefore, there is no need to maintain a diameter the same as that of the first division portion (44) that wraps the protection tube (60). In order to improve the flexibility of the second cable (20), its diameter is made to gradually decrease towards its end. The division molding portion (40) wraps the first cable (10) and second cable (20) which are separated, and the combination cable (2), which is not separated, thus preventing intrusion of any foreign matters, such as moisture.

The connector molding portion (50) is a structure that molds the connection portion between the connector (30) and the first cable (10). The connector molding portion (50) can mold concurrently with, before, or after the division molding portion (40). The connector molding portion (50) bends to take ¬ shape; thus, when the connector (30) is set, the first cable (10) can be bent to reach a preset degree and direction. The connector molding portion (50) is roughly right-angled and fixes the connector (30). The connector molding portion (50) wraps the separated first cable (10) and part of the connector (30), capable of preventing intrusion of foreign matters, such as moisture.

As shown in FIG. 4 and FIG. 6, the protection tube (60) is a structure that protects the first cable (10), with its ends respectively fixed to the division molding portion (40) and the connector molding portion (50). The protection tube (60) is cylindrical, with its outer surface and inner surface being circular. The protection tube (60) can be made of Thermoplastic Polyurethane (TPU) rubber. The protection tube (60) can also be made of one of other various types of rubber or soft synthetic resin. As shown in FIG. 4, the inner diameter of the protection tube (60) is larger than the lengthwise diameter of the two winding displacements of the first cable (10). Therefore, the first cable (10) can be inserted into the protection tube (60) easily. In addition, with such a structure, the assembly performance of the first cable (10) for the protection tube (60) can be improved. When the division molding portion (40) and the connector molding portion (50) are molded respectively on either side of the protection tube (60), a molding compound may flow into the inner side of the protection tube (60) through the open spaces on both sides of the protection tube (60). In order to prevent the aforesaid problem, it is necessary to dispose a plurality of isolation portions (70), which wrap the first cable (10) and are inserted respectively from both sides of the protection tube (60), thus preventing the flow of a molding compound into the protection tube (60).

As shown in FIG. 6 and FIG. 7, the isolation portions (70) are the structures that are respectively inserted from the inner sides of both ends of the protection tube (60) and wrap the exterior of the first cable (10), capable of preventing the flow of a molding compound into the protection tube (60). The isolation portions (70), as far as possible, block the open spaces formed between the inner surface of the protection tube (60) and the outer surface of the first cable (10). Thus, when the division molding portion (40) and the connector molding portion (50) are molded, the supplied molding compound can be prevented from flowing into the spaces on the inner side of the protection tube (60).

Said isolation portion (70) comprises the insertion portion (72), which is inserted into the inner side of said protection tube (60); and the expansion portion (74), which closely fits the inlet of said protection tube (60) after expanding at the end of one side of said insertion portion (72), capable of preventing the flow of a molding compound into said protection tube (60). Said insertion portion (72), having an outer diameter approximately the same as or slightly smaller than the inner diameter of said protection tube (60), is inserted closely fitting said protection tube (60). Thus, a certain space is maintained between said protection tube (60) and the outer surface of the first cable (10). The isolation portion (70) can be made of Thermoplastic Polyurethane (TPU) rubber. Certainly, the isolation portion (70) can also be made of one of other various types of rubber or soft synthetic resin.

On the isolation portion (70), the cut-open portion (76) that is cut open lengthwise is formed; after it opens, the first cable (10) can be inserted into it. As the cut-open portion (76) is spaced by a certain distance widthwise, when the protection tube (60) is set on the first cable (10), said portion can open to both sides. Certainly, the isolation portion (70) can also be inserted towards the outer surface of the first cable (10) through the central hole. The isolation portion (70), having an elliptical inner surface, wraps the outer surface of the first cable (10) that comprises two winding displacements, thus preventing the inflow of a molding compound. That is, said isolation portion (70) has a circular outer surface and an elliptical inner surface. Formation of an elliptical inner surface in the isolation portion (70) helps to minimize the gap with the outer surface of the first cable (10). At the end of the insertion portion (72), the narrow portion (78), having an outer diameter smaller than that of the insertion portion (72), can be formed, allowing easy insertion into the inner side of the protection tube (60). The narrow portion (78) can be evenly narrow within its setting interval or oblique, becoming narrower and narrower towards the end.

As shown in FIG. 8, in order to install the mounting bracket (90), the cord grommet portion (80) is formed and integrated on the outer surface of the division molding portion (40). As shown in FIG. 1, when the cord grommet portion (80) is set on the division molding portion (40) and in any other position on the combination cable (2), the number of components may increase. In contrast, as shown in FIG. 8, when the cord grommet portion (80) is integrated with the division molding portion (40), the number of components and manufacture costs can be reduced. In this case, if the cord grommet portion (80) is provided on the integral portion (42) of the division molding portion (40), it is convenient to install the mounting bracket (90).

By referring to FIG. 9, the following describes in detail the specific procedure of the method for manufacturing a seal mold divided structure for combination cable according to the present invention.

First, the method for manufacturing a seal mold divided structure for combination cable according to the present invention comprises the phase of exposure and division (S10), the phase of sheathing setting (S20), the phase of isolation portion setting (S30), the phase of connector setting (S40), the phase of WSS setting (S50), the phase of forming the division molding portion (S60), and the phase of forming the connector molding portion (S70).

The phase of exposure and division (S10) is the phase of removing the outer sheathing (4) of the combination cable (2) to expose and separate partial sections of the first cable (10) and the second cable (20). In this case, part of the inner sheathing (6) possibly remains on the second cable (20).

The phase of sheathing setting (S20) is the phase of setting the sheathing (60) on the outer surface of the separated first cable (10). The protection tube (60) is cylindrical, with its outer surface and inner surface being circular.

The phase of isolation portion setting (S30) is the phase of wrapping said first cable (10) from the inner sides at both ends of said protection tube (60) and respectively inserting and setting the isolation portion (70). On the isolation portion (70), the cut-open portion (76) that is cut open lengthwise is formed; after it opens, the first cable (10) can be inserted into it.

The connector setting phase (S40) is the phase of setting the EPB connector (30) at the end of the first cable (10).

The phase of WSS setting (S50) is the phase of setting the WSS (22) at the end of the second cable (20).

The phase of forming the division molding portion (S60) is the phase of wrapping the division portion between the first cable (10) and the second cable (20) and one end of the protection tube (60) to form the division molding portion (40). The division molding portion (40) concurrently wraps the division portion between the first cable (10) and the second cable (20) and part of the combination cable (2), thus preventing intrusion of any foreign matters, such as moisture.

The phase of forming the connector molding portion (S70) is the phase of wrapping the connection portion between the connector (30) and the first cable (10) and the other end of the protection tube (60) to form the division molding portion (50). The connector molding portion (50) bends to take the shape of "¬". The connector molding portion (50) wraps the first cable (10) and part of the connector (30), capable of preventing intrusion of foreign matters, such as moisture.

While the present invention has been particularly described above with reference to preferred embodiments shown in the drawings, it should be understood that said embodiments are only exemplary and that those of ordinary skill in the art can make various modifications and equivalent substitutions therefrom.

The invention claimed is:

1. A seal mold divided structure for a combination cable comprising:

a first cable and a second cable separated from the combination cable;

a connector provided at an end of said first cable;

a division molding portion that molds the division part between said first cable and second cable and keeps said first cable and second cable separated from each other;

a connector molding portion that molds the connection part between said connector and said first cable;

a protection tube that protects said first cable, with its ends respectively fixed to said division molding portion and said connector molding portion; and isolation portions, which are respectively inserted from the inner sides of both ends of said protection tube and wrap an exterior of said first cable, capable of preventing the flow of a molding compound into said protection tube.

2. The seal mold divided structure for the combination cable of claim 1 wherein, said connector can be used as the connector of at least one of: an electronic parking brake (EPB); a wheel speed sensor (WSS) or a WSS extension cable connector is connected to said second cable.

3. The seal mold divided structure for the combination cable of claim 1 wherein, said division molding portion further comprises the following structures:

an integral portion, which wraps the outer surface of said combination cable and fixes it;

a first division portion, which is formed by bending towards the side of the first cable exposed to said integral portion; and a second division portion, which is formed by straightening towards the side of the second cable exposed to said integral portion.

4. The seal mold divided structure for the combination cable of claim 1 wherein, said isolation portion further comprises:

an insertion portion, which is inserted into the inner side of said protection tube; and an expansion portion, which closely fits an inlet of said protection tube after expanding at an end of one side of said insertion portion, capable of preventing the flow of said molding compound into said protection tube.

5. The seal mold divided structure for the combination cable of claim 4 wherein, on said isolation portion, a cut-open portion that is cut open lengthwise is formed and into which said first cable can be inserted.

6. The seal mold divided structure for the combination cable of claim 4 wherein, said isolation portion, defines an elliptical inner surface which wraps the outer surface of said first cable that comprises two winding displacements, thus preventing the inflow of a molding compound.

7. The seal mold divided structure for the combination cable of claim 4 wherein, a narrow portion, having an outer diameter smaller than that of said insertion portion, is formed at the end of said insertion portion in order to facilitate the insertion into the inner side of said protection tube.

8. The seal mold divided structure for the combination cable of claim 1 wherein, a cord grommet portion is formed and integrated on the outer surface of said division molding portion, allowing a mounting bracket to be installed.

9. The seal mold divided structure for the combination cable of claim 8 wherein, said cord grommet portion is located on the integral portion of said division molding portion.

10. The seal mold divided structure for the combination cable of claim 1 wherein said connector molding portion bends to take a "¬" shape to form a predetermined angle with said first cable when said connector is installed.

11. A method for manufacturing a seal mold divided structure for a combination cable, comprising:
removing a sheathing of the combination cable to expose a first cable and a second cable and separate them;
providing a protection tube on the outer surface of the separated first cable;
wrapping said first cable from the inner sides at both ends of said protection tube and respectively inserting and setting an isolation portion;
providing an EPB connector at the end of said first cable;
providing a WSS at the end of said second cable;
wrapping and molding a division portion between said first cable and second cable and one end of said protection tube to form a division molding portion; and
wrapping and molding a connection portion between said connector and said first cable and the other end of said protection tube to separate it from said division molding portion, thus forming a connector molding portion.

* * * * *